(12) United States Patent
Benman

(10) Patent No.: US 7,839,399 B2
(45) Date of Patent: Nov. 23, 2010

(54) SYSTEM AND METHOD FOR VOLUMETRIC DISPLAY OF VIDEO IMAGES EXTRACTED FROM ARBITRARY BACKGROUND ENVIRONMENTS

(76) Inventor: William J. Benman, 2049 Century Park East, Suite 2740, Los Angeles, CA (US) 90067

( * ) Notice: Subject to any disclaimer, the term of this patent is extended or adjusted under 35 U.S.C. 154(b) by 2102 days.

(21) Appl. No.: 11/818,974

(22) Filed: Dec. 8, 2003

(65) Prior Publication Data
US 2008/0278474 A1 Nov. 13, 2008

Related U.S. Application Data

(63) Continuation-in-part of application No. 09/363,456, filed on Jul. 29, 1999, now abandoned, and a continuation-in-part of application No. 09/795,290, filed on Mar. 20, 2000, now abandoned, and a continuation-in-part of application No. 09/905,692, filed on Nov. 28, 2000, now Pat. No. 6,798,407.

(51) Int. Cl.
G09T 1/00 (2006.01)
(52) U.S. Cl. ........................ 345/418; 345/419; 345/473; 345/630; 358/462; 382/232; 348/14.08; 348/14.16; 348/584; 348/591; 348/598; 725/135
(58) Field of Classification Search ................. 345/419, 345/473, 418, 630; 348/584, 591, 592, 598; 348/14.08, 14.16; 382/232; 358/462
See application file for complete search history.

(56) References Cited

U.S. PATENT DOCUMENTS

| | | | |
|---|---|---|---|
| 4,827,344 A | 5/1989 | Astle et al. | |
| 5,130,794 A | 7/1992 | Ritchey | |
| 5,310,349 A | 5/1994 | Daniels et al. | |
| 5,374,952 A | 12/1994 | Flohr | |
| 5,388,990 A | 2/1995 | Beckman | |
| 5,563,988 A | 10/1996 | Maes et al. | |
| 5,634,850 A | 6/1997 | Kitahara et al. | |
| 5,640,200 A | 6/1997 | Michael | |
| 5,644,508 A | 7/1997 | McNary et al. | |
| 5,671,381 A | 9/1997 | Strasnick | |
| 5,706,417 A | 1/1998 | Adelson | |
| 5,777,665 A * | 7/1998 | McNelley et al. | ........ 348/14.16 |
| 5,779,549 A | 7/1998 | Walker | |
| 5,784,546 A | 7/1998 | Benman, Jr. | |
| 5,864,342 A | 1/1999 | Kajiya et al. | |

(Continued)

FOREIGN PATENT DOCUMENTS

DE 29803072 U 6/1998

OTHER PUBLICATIONS

Mitsunaga et al. "AutoKey: Human Assisted Key Extraction". ACM 1995, pp. 265-272.*

(Continued)

*Primary Examiner*—Kimbinh T Nguyen
(74) *Attorney, Agent, or Firm*—William J. Benman

(57) ABSTRACT

A system and method for volumetric display of video images extracted from arbitrary background environments comprising an arrangement for extracting a video image in real time from an arbitrary background and creating a stream of extracted image data in response thereto and a free space or volumetric display operationally adapted to display the stream.

1 Claim, 6 Drawing Sheets

U.S. PATENT DOCUMENTS

| | | |
|---|---|---|
| 5,886,701 A | 3/1999 | Chauvin et al. |
| 5,923,330 A | 7/1999 | Tarlton et al. |
| 5,964,660 A | 10/1999 | James |
| 5,966,130 A | 10/1999 | Benman, Jr. |
| 5,970,183 A | 10/1999 | Amemiya et al. |
| 5,973,697 A | 10/1999 | Berry et al. |
| 6,020,931 A | 2/2000 | Bilbrey et al. |
| 6,034,785 A | 3/2000 | Itoh |
| 6,084,590 A | 7/2000 | Robotham et al. |
| 6,201,544 B1 | 3/2001 | Ezaki |
| 6,208,977 B1 | 3/2001 | Hernandez et al. |
| 6,217,446 B1 | 4/2001 | Sanbongi |
| 6,223,165 B1 | 4/2001 | Lauffer |
| 6,278,466 B1 | 8/2001 | Chen |
| 6,293,865 B1 | 9/2001 | Kelly et al. |
| 6,295,374 B1 | 9/2001 | Robinson et al. |
| 6,325,632 B1 | 12/2001 | Chao et al. |
| 6,346,938 B1 | 2/2002 | Chan et al. |
| 6,362,817 B1 | 3/2002 | Powers et al. |
| 6,366,316 B1 | 4/2002 | Parulski et al. |
| 6,377,263 B1 | 4/2002 | Falacara et al. |
| 6,400,374 B2 * | 6/2002 | Lanier ......................... 345/630 |
| 6,437,777 B1 | 8/2002 | Kamachi |
| 6,476,802 B1 | 11/2002 | Rose et al. |
| 2003/0051255 A1 * | 3/2003 | Bulman et al. .............. 725/135 |
| 2006/0181607 A1 * | 8/2006 | McNelley et al. ........ 348/14.08 |

OTHER PUBLICATIONS

Zhou et al. "Automated Visual Presentation: From Heterogeneous Information to Coherent Visual Disclosure". Published 1998.*

Selfridge et al., "Cospace: Combining Web Browsing and Dynamically Generated, 3-D, Multiuser Environments", 1999.

Greenhaigh et al., "A QoS Architecture for Collaborative Virtual Environments", School of Computer Science and Information Technology, The University of Nottingham, Nottingham, UK, pp. 121-130, 1999.

D Gamers; Jan-Albert van Ree; #DSim Archive; Publish May 18, 1999; Online ware simulation: the future or just more hype?

Aouad et al., "Developing a Virtal Reality Interface for an Integrated Project Database Environment", Department of Surveying, University of Salford, IEEE 1997, pp. 192-197.

Williams, "Applying AI to Virtual Environments," AI Expert, v7,n8, p. 26(4) Aug. 1992.

Henderson, Jr. et al, "Rooms: The Use of Multiple Virtual Workspaces to Reduce Space Contention in a Window-Based Graphical User Interface," ACM, Transactions on Graphics, vol. 5, No. 3, pp. 211-243, Jul. 1986.

* cited by examiner

SYSTEM AND METHOD FOR VOLUMETRIC DISPLAY OF VIDEO IMAGES EXTRACTED FROM ARBITRARY BACKGROUND ENVIRONMENTS

REFERENCE TO RELATED APPLICATION

This Application is a Continuation-In-Part of U.S. patent application Ser. No. 09/363,456, entitled SYSTEM AND METHOD FOR EXTRACTING IMAGES WITHOUT MONOCHROMATIC BACKGROUND, filed Jun. 29, 1999 now abandoned, by W. Benman and U.S. patent application Ser. No. 09/795,290, entitled FUNCTIONAL THREE-DIMENSIONAL WEB SITE WITH DYNAMIC IMAGE EXTRACTION AND TRANSPLANTATION, filed Mar. 20, 2000 now abandoned, by W. Benman and U.S. patent application Ser. No. 09/905,692, entitled SYSTEM AND METHOD FOR PROVIDING A FUNCTIONAL VIRTUAL ENVIRONMENT WITH REAL TIME EXTRACTED AND TRANSPLANTED IMAGES, filed Nov. 28, 2000 now U.S Pat. No. 6,798,407, by W. Benman.

BACKGROUND OF THE INVENTION

1. Field of the Invention

The present invention relates to image processing systems and techniques. More specifically, the present invention relates to systems and techniques for acquiring and displaying video image data.

2. Description of the Related Art

Many works of science fiction and science fantasy show someone speaking with a remote user via images of the remote user seemingly projected in free space. Despite the frequent appearance of these images over decades of film and television production, no real practical system has been developed to date that is capable of capturing and extracting a user's image from an arbitrary (non-monochromatic) background, transmitting the image over a communication channel and displaying the image in free space.

A display of live image data projected into free space offers the potential for a significantly enhanced communication experience. Hence, there is a need in the art for a system or method for acquiring and extracting video images from arbitrary backgrounds and displaying the images in free space or in a volumetric space.

SUMMARY OF INVENTION

The need in the art is addressed by the present invention, a system and method for volumetric display of video images extracted from arbitrary background environments comprising: means for extracting a video image in real time from an arbitrary background and creating a stream of extracted image data in response thereto and a free space or volumetric display operationally adapted to display the stream.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In accordance with the present teachings, live image data is extracted from arbitrary backgrounds in accordance with the teachings of U.S. patent applications Ser. Nos. 09/363,456, 09/795,290, and 09/905,692 filed Aug. 18, 1999, May 12, 2000 and Nov. 28, 2000 respectively by Benman and U.S. Pat. No. 5,966,130 the teachings of all of which are hereby incorporated herein by reference. As discussed more fully below, the extracted image data stream is then transmitted via a wired or wireless network to a receiver and displayed in a free space display.

Figure 1:
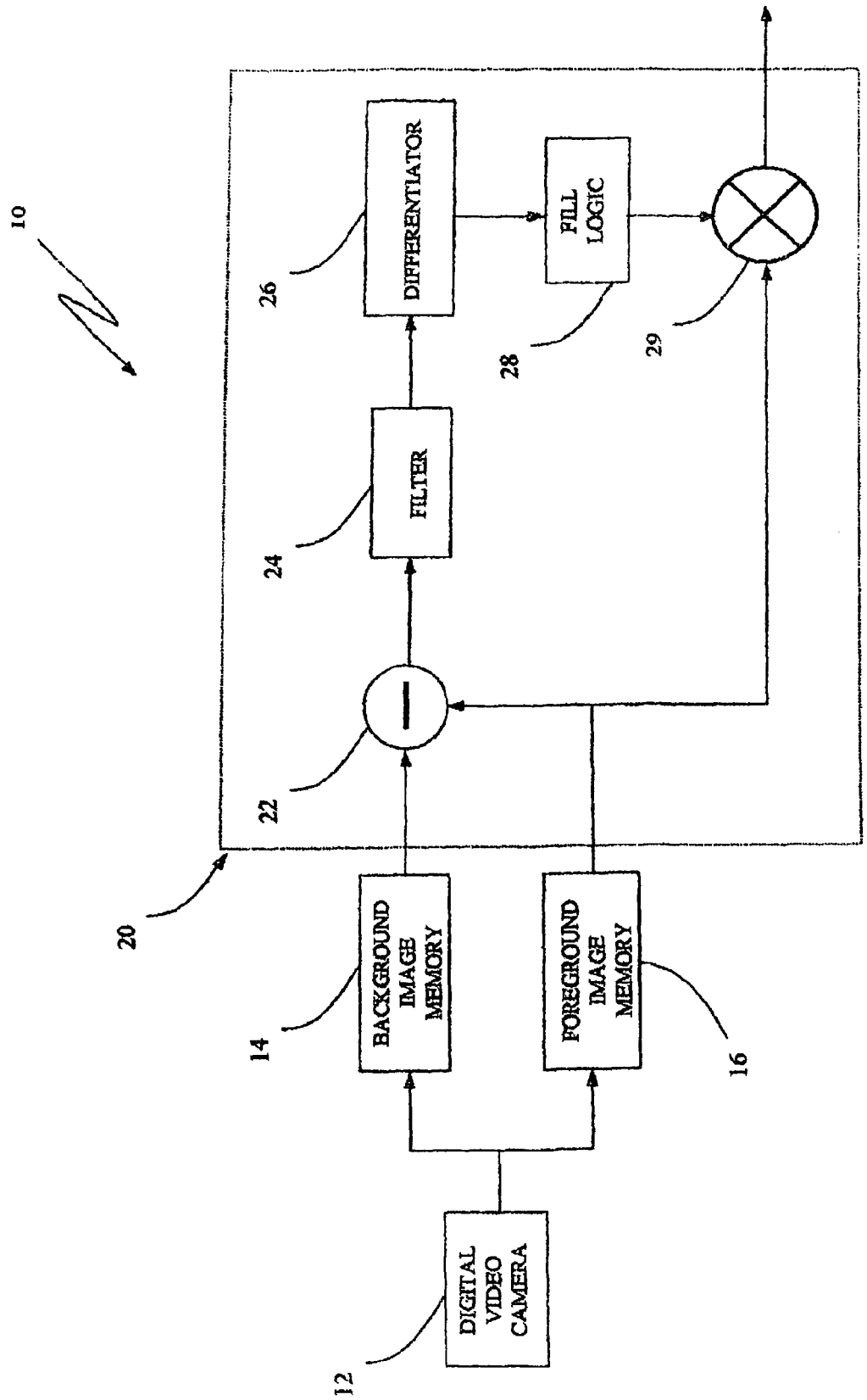
FIG. 1 is a block diagram of an illustrative implementation of an imaging system constructed in accordance with the teachings of the present invention.

FIG. 1 is a block diagram of an illustrative implementation of an imaging system constructed in accordance with the teachings of the present invention. The system 10 includes a digital video camera 12 adapted to provide single or multiple frames of video data in digital form. Numerous companies such as ADS Technologies, iBot, Intel and others make such cameras. In the alternative, a camera with an analog output may be used if the output thereof is converted to digital form with an analog to digital converter or other such suitable device. Those skilled in the art will appreciate that the invention is not limited to the type of digital imaging device used.

The output of the camera 12 is input to a background image memory 14. For this image, the user remains outside the field of view of the camera as this memory is used to stored a frame of static image data that is to be removed from the live video frames as discussed more fully below.

Figure 3:
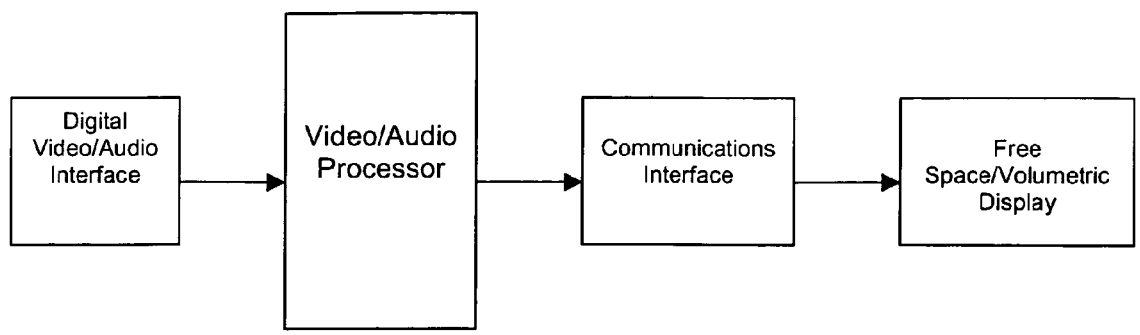
FIG. 3 is a diagram which shows an illustrative application of the teachings of the present invention in connection with a free space display.

FIG. 3 is a diagram which shows an illustrative application of the teachings of the present invention in connection with a free space display.

Figure 4:
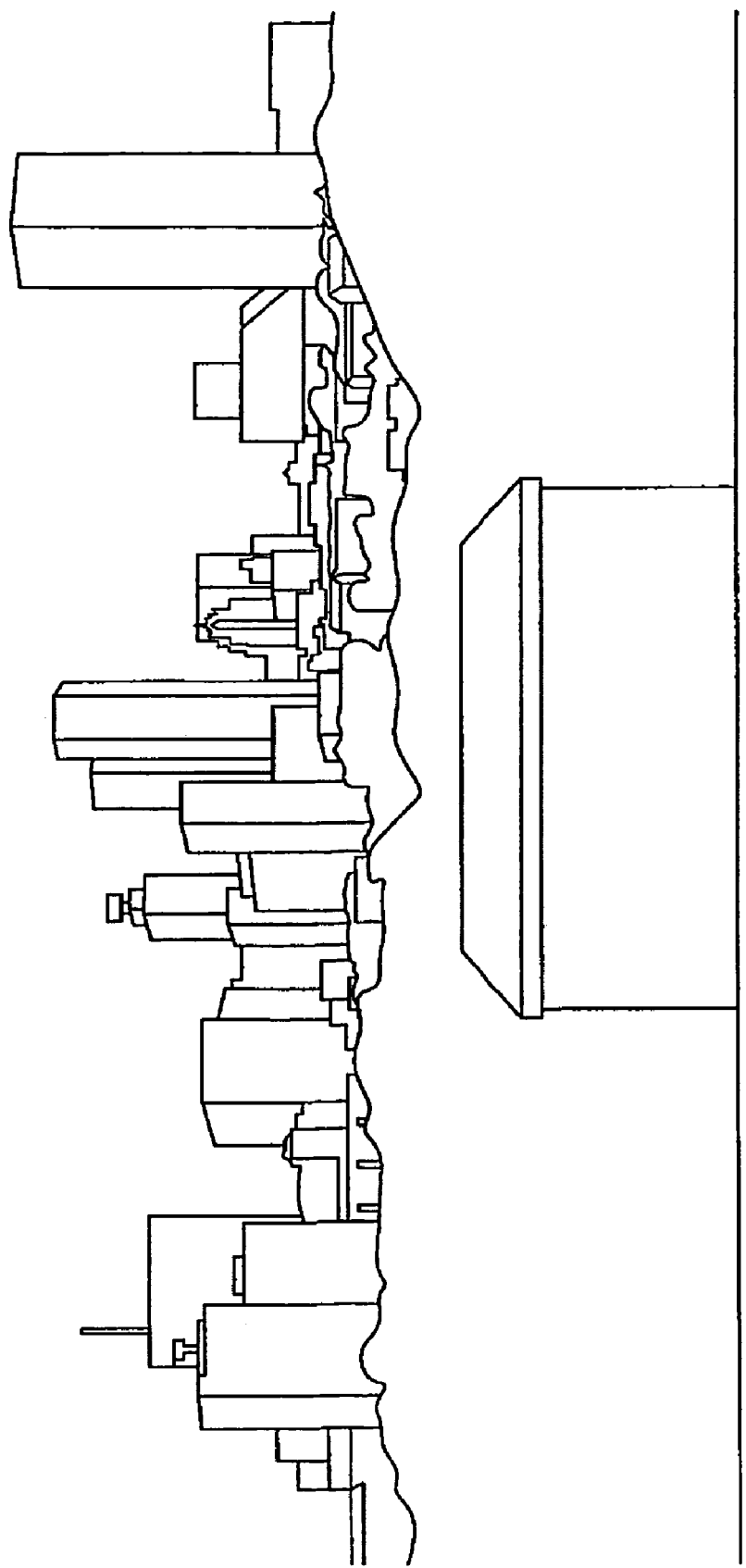
FIG. 4 provides an illustrative frame of background image data as stored by the background memory in accordance with the teachings of the present invention.

FIG. 4 provides an illustrative frame of background image data as stored by the background memory 14.

In the illustrative embodiment of FIG. 1, a frame of live image data containing foreground imagery is stored in a second memory 16.

Figure 5:
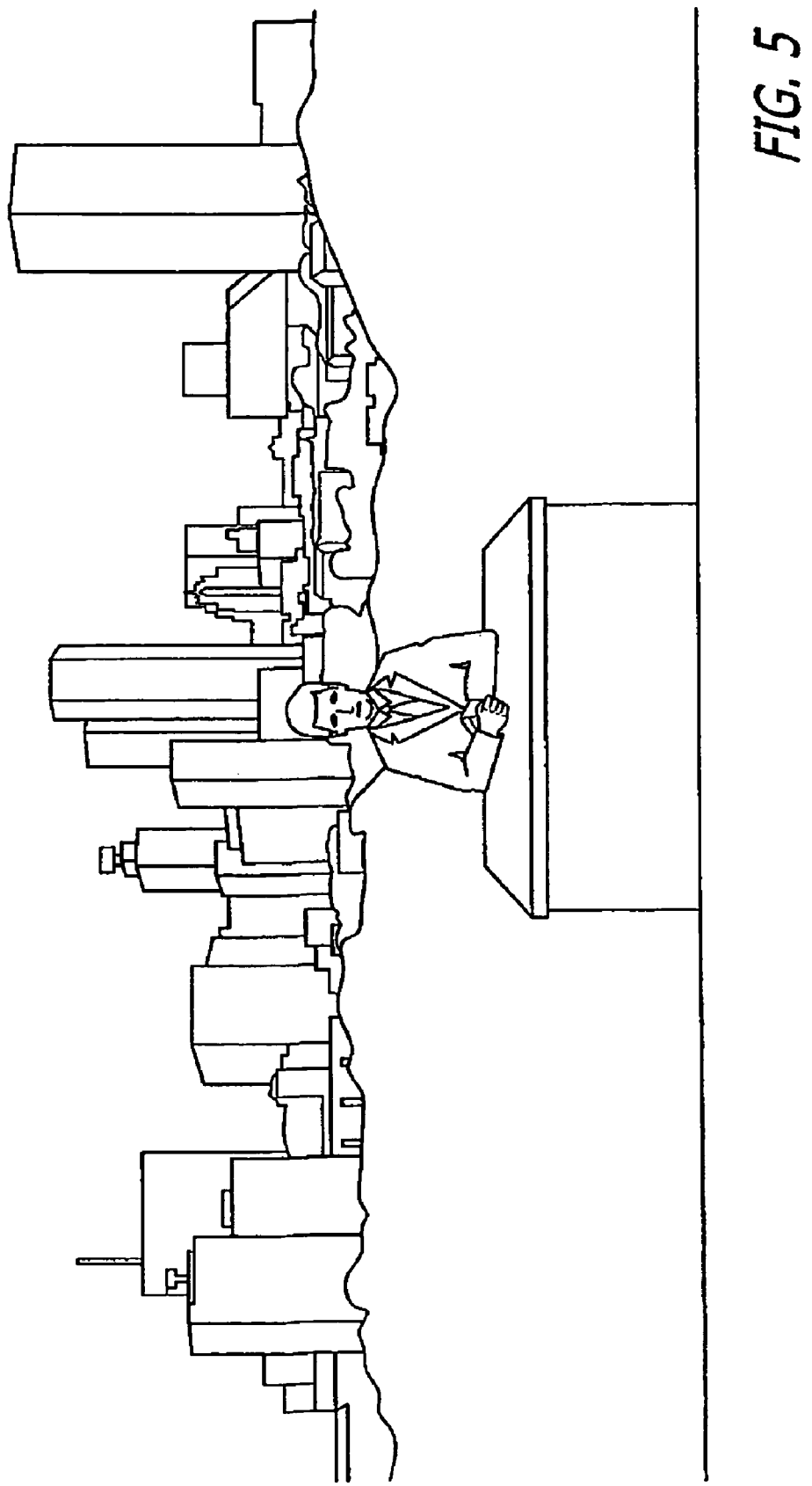
FIG. 5 depicts an illustrative camera output of a frame of live image data.

FIG. 5 depicts an illustrative camera output of a frame of live image data. This frame contains at least a portion of the background image of FIG. 4 partially obscured by an image of a user in the foreground thereof. In accordance with the present teachings, the background imagery is removed by an image processor 20 and the foreground image is transplanted into another (e.g., computer generated) environment.

In FIG. 5, a subtractor 16 digitally subtracts signals stored in the first and second memories representing the color and intensity of individual picture elements (pixels) and provides the output to a filter. The effect of the subtraction is to eliminate the background imagery leaving a color distorted image of any foreground imagery therein. (In this context, foreground imagery is any imagery not present at the time the system was calibrated by capturing the frame of background imagery.)

Figure 6A:
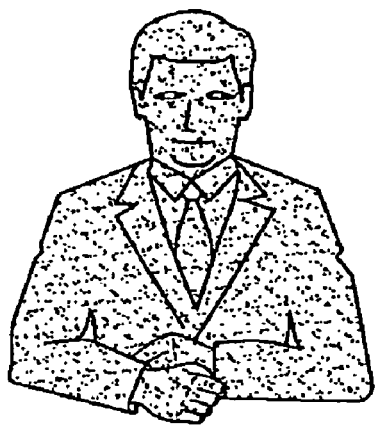
FIG. 6a illustrates the output of a subtractor utilized by the image processor of the illustrative embodiment of the invention depicted in FIG. 1.
Figure 6B:
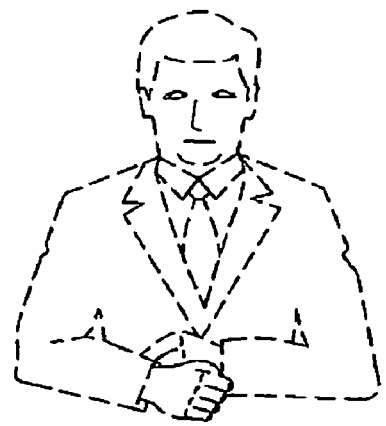
FIG. 6b illustrates a differentiated and filled difference image as output by the fill logic utilized by the image processor of the illustrative embodiment of the invention depicted in FIG. 1.
Figure 6C:
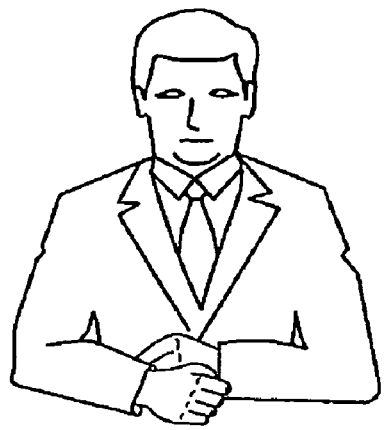
FIG. 6c illustrates a foreground isolated image as output by the image processor of the illustrative embodiment of the invention depicted in FIG. 1.

FIG. 6a illustrates the output of the subtractor 16. This image is processed by the filter 24 to remove the color and brightness distortion therein resulting from the subtraction process. This image is differentiated to provide an edge defined image. Fill logic 28 fills the image, between the edges thereof, with homogeneous values (e.g., logical '1's) and logical zeros outside the image to provide a template as depicted in FIG. 6b. The template is multiplied by the foreground image to provide an output image as depicted in FIG. 6c.

Figure 2:
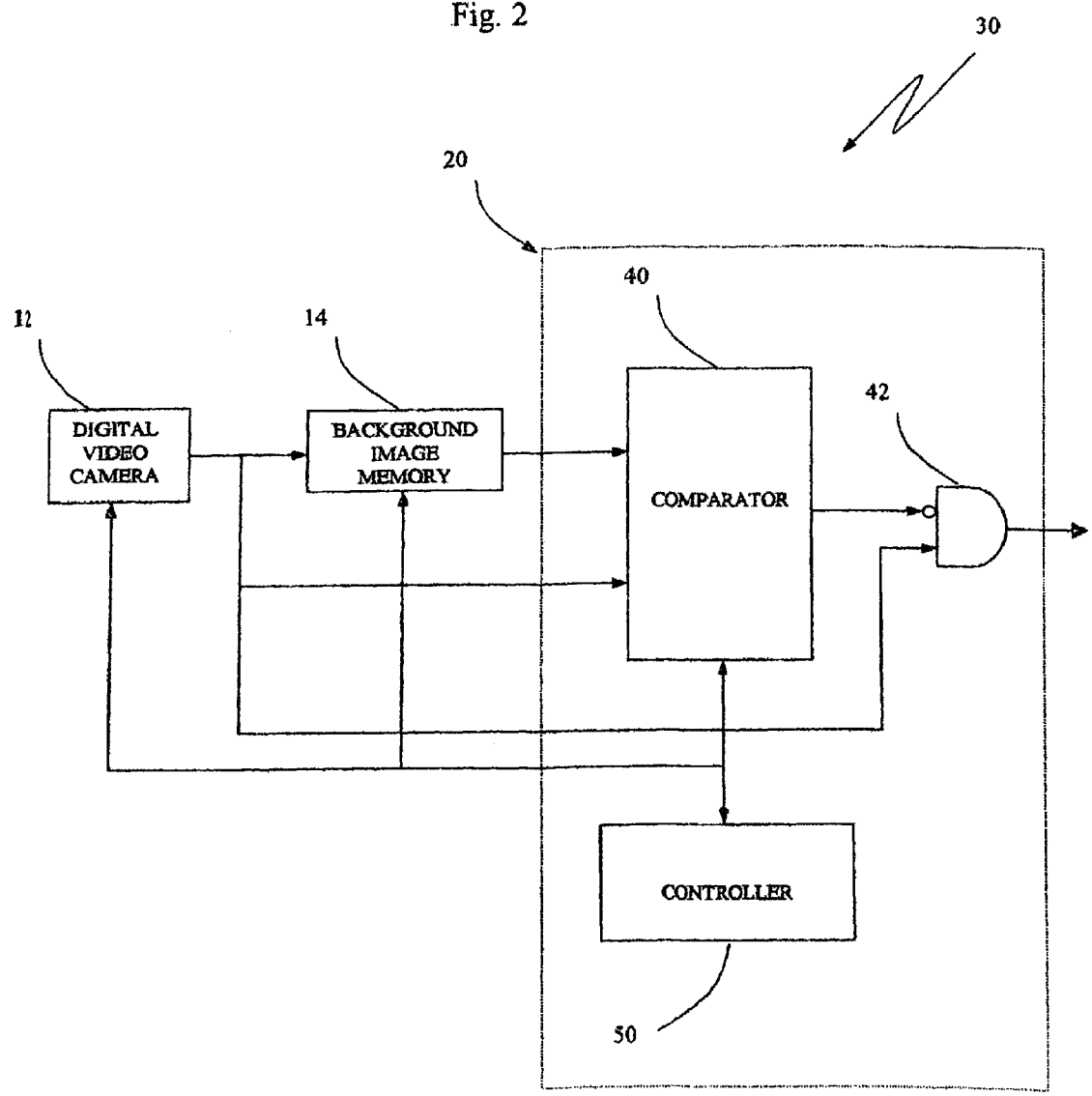
FIG. 2 is a diagram that depicts a preferred embodiment of an imaging system constructed in accordance with the teachings of the present invention.

FIG. 2 is a diagram which depicts a preferred embodiment of an imaging system constructed in accordance with the teachings of the present invention. In the preferred embodiment, the system 30 includes the digital camera and background image memory 14 of FIG. 1. However, in the preferred embodiment, the image processor 20 is implemented with a comparator 40, AND gate 42 and microcontroller 50. The background image is stored as per FIG. 1. However, in the preferred embodiment, the comparator scans the dynamic live video image and compares it to the stored background image on a pixel by pixel basis. If there is a match, the comparator 40 outputs a logical one, which is inverted at the input to the AND gate 42. If there is no match, the comparator outputs a logical zero, which turns on the AND gate 42. This enables the current pixel of live video data to be passed by the AND gate as the output of the image processor 20.

Those skilled in the art will appreciate that system would be clocked for proper timing and latches and other delay elements may be required for this purpose as well. These elements may be provided by one of ordinary skill in the art as needed for a given application without undue experimentation. A controller 50 controls each element of the circuit along with the clock timing in response to user input or software control.

Thus, a stream of extracted video images is created. The received stream is then input either directly or via a wired or wireless network into a display capable of projecting the image into free space. Such a display is currently made and sold as a Heliodisplay by IO$_2$ Technology. As an alternative, a volumetric display may be employed. Volumetric displays are currently made by several manufacturers including, Actuality Systems and others. As discussed in a white paper by Gregg E. Favalora et al. of Actuality Systems, Inc. in "100 Million-Voxel Volumetric Display" published at http://www.actuality-systems.com/admin/publications/Actuality$_{13}$ Whitepaper_AeroSense_2002.pdf and presumably in 2002 in Cockpit Displays IX: Displays for Defense Applications (of the SPIE's 16th Annual International Symposium on Aerospace/Defense Sensing, Simulation, and Controls) by Society of Photo-Optical Instrumentation Engineers, Volumetric displays are the set of three-dimensional display technologies that produce volume-filling imagery. (This term is not to be confused with "volume rendering," a computer-graphics technique of a similar name that is commonly used in medical imaging and petroleum visualization.) Barry Blundell and Adam Schwarz offer the following definition: "[a] volumetric display device permits the generation, absorption, or scattering of visible radiation from a set of localized and specified regions within a physical volume."[3] The definition might need to be extended to include: (1) holographic video systems [4], which use piecewise approximation to synthesize the wavefronts that emanate from a 3-D scene, and (2) the set of re-imaging systems that use volume-filling imagery as the source [5]. Simply put, volumetric displays create imagery that appears to float in a volume. Typically the imagery can be seen from a wide variety of angles. Furthermore, goggles are generally not required to perceive the 3-D imagery. Several publications provide surveys of existing volumetric display architectures. The authors point out the work of M. Halle [6], K. Langhans et al [7], and Blundell and Schwarz [3] as particularly instructive. The majority of volumetric displays exploit persistence of vision by projecting 0-, 1-, or 2-D components of a scene rapidly enough that the retina fuses them into a 3-D perception.

Although free space and volumetric displays are known, these displays have not heretofore been used to display video images extracted in real time from arbitrary (heterogeneous) backgrounds.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention. Accordingly,

What is claimed is:

1. A system for volumetric display of video images extracted from arbitrary background environments comprising:
    means for extracting a video image in real time from a chromatically heterogeneous background and creating a stream of extracted image data in response thereto and
    a volumetric display operational adapted to display said stream.

* * * * *